US008068932B2

(12) United States Patent
Kirzinger

(10) Patent No.: US 8,068,932 B2
(45) Date of Patent: Nov. 29, 2011

(54) ACCESS-CONTROLLED STORAGE SYSTEM

(75) Inventor: Hannes Kirzinger, Puergen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 471 days.

(21) Appl. No.: 12/186,695

(22) Filed: Aug. 6, 2008

(65) Prior Publication Data

US 2009/0198347 A1 Aug. 6, 2009

(30) Foreign Application Priority Data

Aug. 14, 2007 (EP) .................................... 07015994
Sep. 5, 2007 (EP) .................................... 07017336

(51) Int. Cl.
*G06F 17/00* (2006.01)

(52) U.S. Cl. ........ 700/237; 700/241; 700/242; 700/243; 221/91; 220/525

(58) Field of Classification Search .................. 700/237; 221/122, 91; 220/525
See application file for complete search history.

(56) References Cited

U.S. PATENT DOCUMENTS

| | | | | |
|---|---|---|---|---|
| 4,598,810 | A * | 7/1986 | Shore et al. | 194/205 |
| 4,763,810 | A * | 8/1988 | Christiansen | 221/3 |
| 4,941,570 | A * | 7/1990 | Kruger et al. | 206/267 |
| 5,046,455 | A * | 9/1991 | Christiansen et al. | 119/56.1 |
| 5,222,789 | A * | 6/1993 | Yoshikawa | 312/270.3 |
| 5,724,764 | A * | 3/1998 | Alsup | 43/54.1 |
| 6,775,591 | B1 * | 8/2004 | Shoenfeld | 700/243 |
| 7,502,666 | B2 * | 3/2009 | Siegel et al. | 700/244 |
| 7,784,689 | B2 * | 8/2010 | Linton et al. | 235/385 |
| 2001/0032035 | A1 | 10/2001 | Holmes et al. | |
| 2001/0034665 | A1 | 10/2001 | Kinory et al. | |
| 2005/0011423 | A1 | 1/2005 | Mercier | |

FOREIGN PATENT DOCUMENTS

| | | | |
|---|---|---|---|
| WO | 99/43234 | A1 | 9/1999 |
| WO | 2006/072111 | A2 | 7/2006 |

* cited by examiner

*Primary Examiner* — Michael K Collins

(57) ABSTRACT

A container for an access-controlled storage system having a plurality of compartments designed to contain an article where access to the article is controlled by granting access to one or more compartments at a time without moving the article, wherein control is provided by a rotary belt with a cut-out directed by deflection pulleys; and an access-controlled storage system having at least two containers and a housing wherein control of the container is actuated to grant access to one or more defined compartments within the container.

5 Claims, 2 Drawing Sheets

ACCESS-CONTROLLED STORAGE SYSTEM

RELATED APPLICATIONS

This application claims priority to EP 07015994.2 filed Aug. 16, 2007 and EP 07017336.4 filed Sep. 5, 2007.

FIELD OF THE INVENTION

The present invention belongs to the technical field of systems for storage and controlled dispensing of items. Examples of these kinds of systems are vendor or selling machines where a user asks for a product and the system provides the requested product. Basically, these systems have two functions namely to store the products and to limit access only to the requested product.

BACKGROUND OF THE INVENTION

The storage systems known to someone skilled in the art need numerous mechanical devices to transport the requested product to a certain spot that grants access to the user.

The mechanical embodiments of the state of the art systems are fragile and complicated and therefore, the fabrication is expensive and the possible applications are limited. Moreover, the mechanical transport devices must be optimized for a certain size and weight of the respective product and therefore, the usability of a certain system for alternative products is very restricted.

The present invention provides a solution to the above mentioned problems, namely to design a storage system that grants controlled access to products without moving the requested product.

Briefly, in contrast to moving the requested products to a certain access area, the present invention provides a system that allows controlling product access with products resting in their initial position. This new and inventive concept has several advantages that will briefly be introduced in the following.

First of all, the system can be used with products of different weight and size, since the products themselves have not to be moved. Secondly, the products can not be misdirected or get jammed while being transported inside the system, because the product is always on its defined initial position. Moreover, the invention allows a flexible arrangement of products within the storage system, said arrangement is only limited by the product size with respect to the size of the compartments.

In more detail, the system of the present invention is preferably used for applications in freezer systems.

SUMMARY OF THE INVENTION

One aspect of the present invention is a container for an access-controlled storage system comprising a) a plurality of compartments each compartment is designed to contain an article, and b) a control means to control the accessibility of said compartments, wherein said control means is capable of granting access to the article of only one compartment at a time without moving said article characterized in that said control means comprises a rotary belt with a cut-out directed by deflection pulleys.

Within the meaning of the present invention, the phrase "container" summarizes all means to store a plurality of articles. Such a container is, e.g., a drawer, a bin, or a receptacle. Such a container is structured to provide a plurality of compartments in order to separate the plurality of articles from each other, whereas each compartment comprises one article.

The phrase "article" summarizes articles comprising one or more components, whereas an article may be composed of several different or identical components. Examples are, e.g., a multi-part article provided in the form of a kit or a multipack of one product.

Throughout the present invention, an "access-controlled storage system" is, e.g., a storage system for consignment stocks or for internal consumption items. Since the allocation of articles to the compartments is known and the access-controlled storage system defines which product will be released, and not the person requesting it, no sophisticated techniques like barcode or RFID (radio frequency identification) are required.

Another aspect of the present invention is an access-controlled storage system comprising a) at least two containers according to the present invention, b) a housing, and c) an actuating means capable of actuating the control means of said container, wherein said actuating means grants access only to a defined compartment within said container.

Within the meaning of the present invention, the phrase "access-controlled storage system" is used to summarize systems comprising two or more containers, wherein said containers can be identical or different.

The "housing" of the access-controlled storage system is designed to receive said containers reversibly.

The phrase "actuating means" summarizes all kinds of devices that can be used to selectively grant access to only one or a certain number of compartments at a time. Said compartments may be located in one container or may be distributed among different containers.

Yet another aspect of the present invention is a method for controlling access to a storage system comprising formulating a request for an article within a container of an access-controlled storage system according to the present invention, adjusting the control means accordingly in order to grant the accessibility only to the compartment containing the requested article, releasing the container, extracting the requested article, and locking the container.

DETAILED DESCRIPTION OF THE INVENTION

Figure 1:
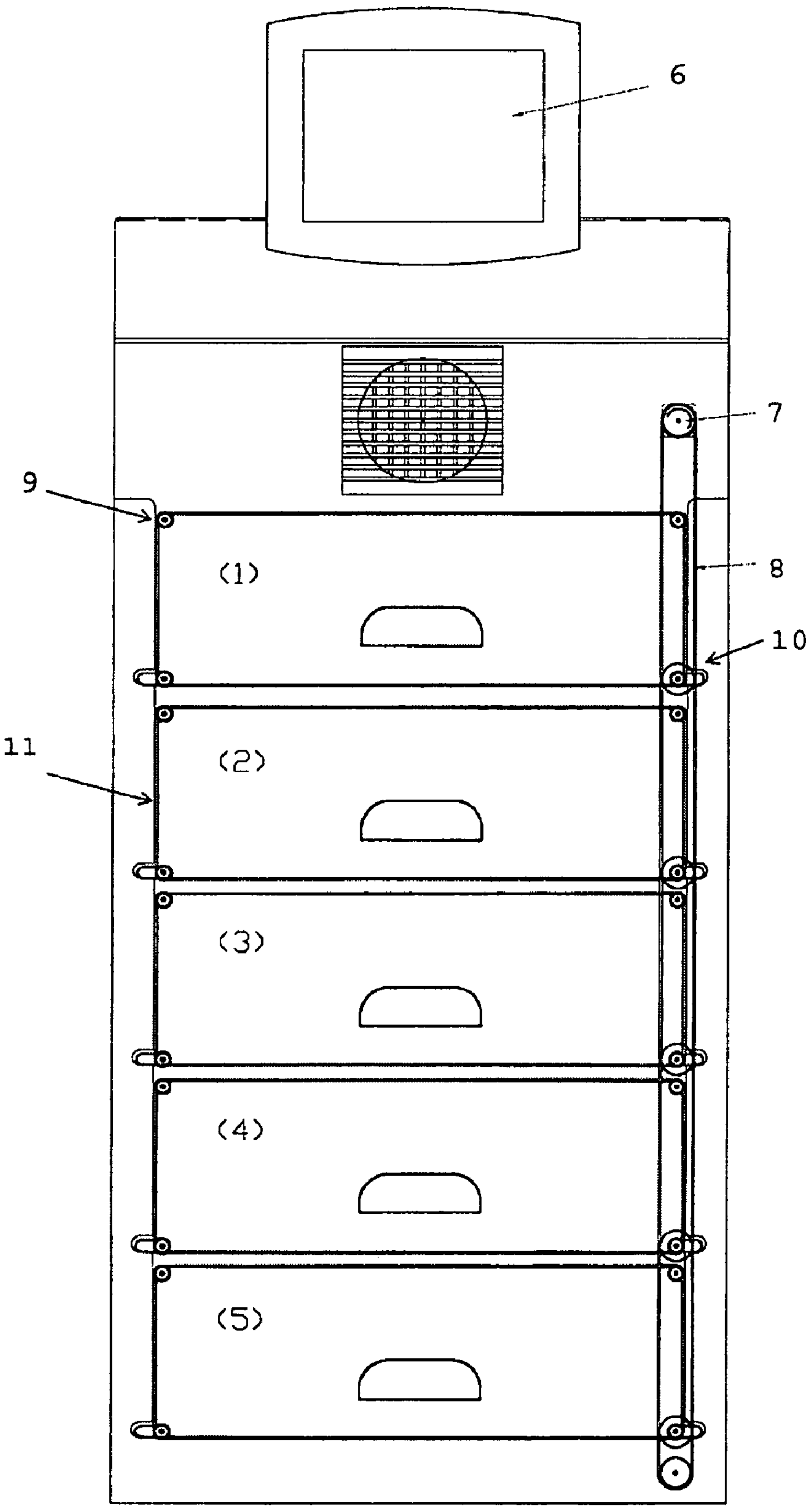
FIG. 1 One embodiment of an access-controlled storage system according to the present invention comprising 5 containers (1-5), an input means (6), an actuation means (7, 8), several deflection pulleys (9), several freewheel clutches (10), and several rotary belts (11).

One aspect of the present invention is a container for an access-controlled storage system comprising a plurality of compartments, each compartment designed to contain an article, and a control means to control accessibility of said compartments, wherein said control means is capable of granting access to the article of only one compartment at a time without moving said article, characterized in that said control means comprises a rotary belt with a cut-out directed by deflection pulleys.

The containers of the present invention are structured to provide a plurality of compartments in order to separate the plurality of articles from each other. It is preferred that each compartment has an opening, wherein said openings are arranged in a plane in order to simplify the access control.

In a preferred embodiment of the container according to the present invention, said control means is capable of granting access to a compartment containing an article requested by a user.

In other words, without a request the control means avoids access to all articles within the container, and the control means only grants access to those compartments containing articles in order to fulfill a user request.

In another preferred embodiment of the container according to the present invention, said control means comprises an input means, said input means capable of recording and executing said user request.

Throughout the present invention, the phrase “input means” summarizes all kinds of means that are able to formulate a request in a machine readable way, such as a keyboard, a touch screen, voice control, chip identification, or biometric identification. All product withdrawals will be monitored by said control means in order to realize, e.g., impending shortage of certain articles within said container.

In an especially preferred embodiment of the container according to the present invention, said input means is capable of recording and executing said user request via a network.

To connect said container input means with a network provides several advantages. E.g., if the input means realizes an impending shortage of certain articles within said container, an automatic refill order can be placed that may be linked additionally with the corresponding invoice generation. Moreover, it is possible to formulate the request at a computer distant to the container (e.g., in an office, while the container is located in a laboratory) and therefore, in this preferred embodiment, the container itself does not need any input means because the distant computer takes on this task.

A preferred container according to the present invention is a container wherein said control means is capable of granting access to a certain compartment based on an article identification number.

Another preferred container according to the present invention is a container wherein said control means comprises a closure with a cut-out.

Such a closure grants access to the articles within the container only at the position of the cut-out, and the cut-out can be moved relative to the compartments of said container. It is possible that a single cut-out is provided in such a way that all compartments of the container are reachable or that a plurality of cut-outs are provided wherein each cut-out may grant access to a certain number of said compartments.

Yet another preferred container according to the present invention is a container wherein the cross section extent of said cut-out is aligned with the cross section extent of said compartments.

In a more preferred container according to the present invention, said cross section extent of said cut-out corresponds to the cross section extent of said compartments.

An also preferred container according to the present invention is a container comprising compartments with different cross section extent and a closure having cut-outs with different cross section extent, wherein for each of said different compartments said belt comprises at least one cut-out with a corresponding cross section extent.

It is clear that the cross section extent of a cut-out must have at least the cross section extent of the compartment in order to provide the possibility to extract the article from said compartment. But it is also possible to provide cut-outs with a larger cross section extent, e.g., a cut-out with a cross section extent spanning two or more compartments together with the respective compartment separations. Moreover, it is necessary to provide a closure with different cut-outs, if a certain container has different compartments. Also in case of a container having different compartments, the cut-outs can be designed to span only one compartment each or to span a certain number of compartments.

In a preferred container according to the present invention, said closure is a flexible plastic sheet.

In another preferred container according to the present invention, said closure is a flexible metal grid.

Such a flexible plastic sheet or flexible metal grid as closure is preferred because it is possible to deflect said closure at the boarders of the container if the entire closure needs to be moved during the alignment of a cut-out with a certain compartment.

In a more preferred container according to the present invention, said closure is a rotary belt directed by deflection pulleys.

Figure 2:
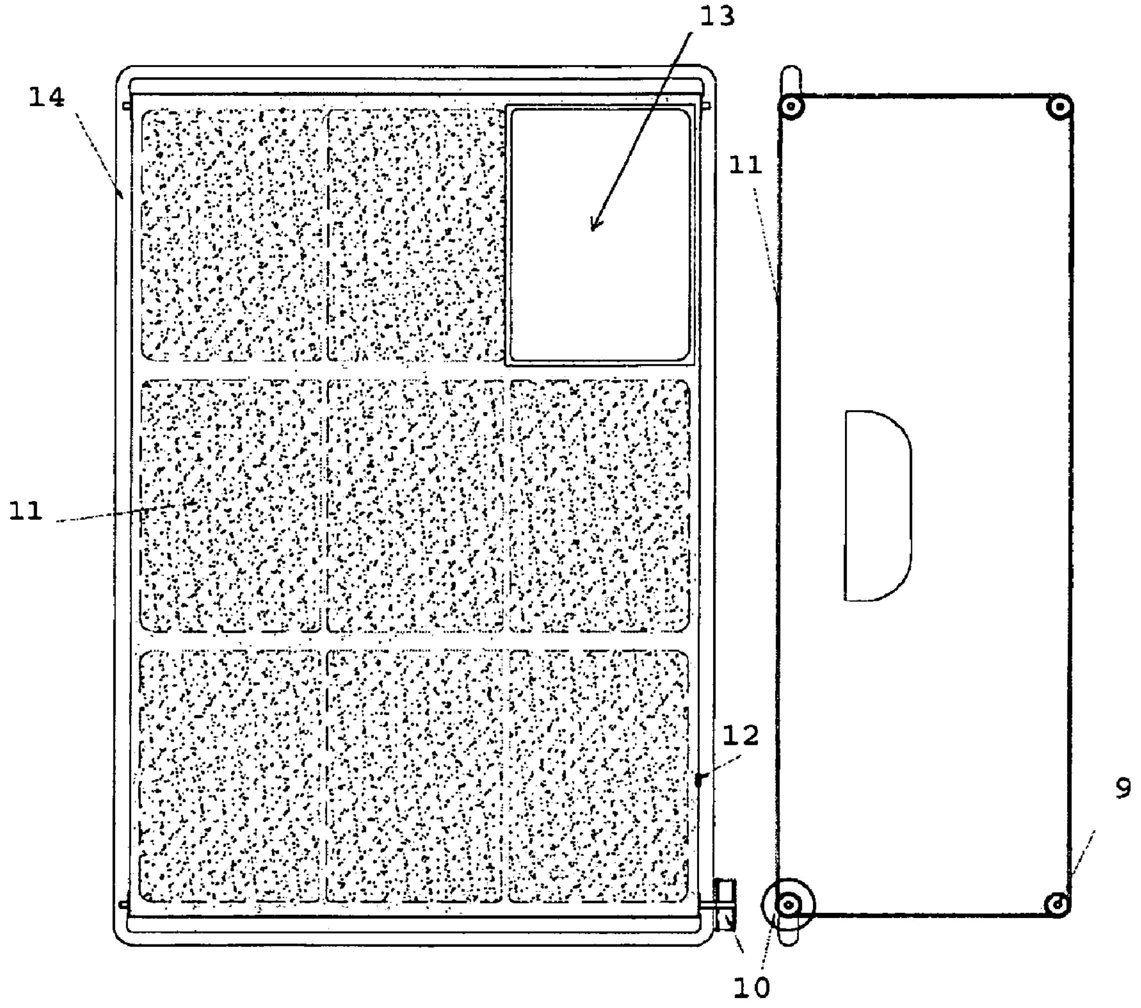
FIG. 2 One embodiment of a container (14) according to the present invention with a control means comprising rotary belts (11), a magnet (12), and cut-outs (13).
Figure 2:
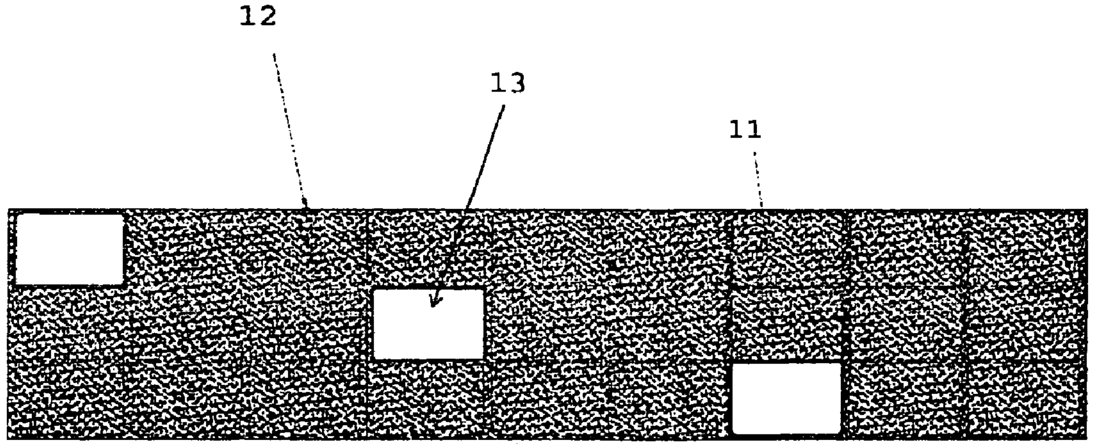

Such an arrangement with deflection pulleys and a rotary belt is a constructively simple closure that enables access control of the container compartments. The rotary belt is moved relative to the compartments, whereas the cut-out within the rotary belt is moved accordingly. Consequently, the rotary belt is moved such that the cut-out of said rotary belt is positioned above the compartment to be accessed and that all other compartments are covered by the rotary belt. The principal of the arrangement with a rotary belt and deflection pulleys is illustrated in FIG. 2 based on an embodiment having a container with 3 rows of 3 compartments each and a rotary belt with 3 cut-outs, one for each row of compartments of said container.

There are many different alternatives to design such an arrangement using deflection pulleys. One possibility is the arrangement of two deflection pulleys that span the belt across the side of the container comprising the compartment openings and enable to roll up and off the belt.

In a more preferred container according to the present invention, four deflection pulleys are arranged in order to direct said rotary belt.

In this embodiment of the present invention, the closure is a belt that revolves around the container spanning the belt across the side of the container comprising the compartment openings, whereas the deflection of said belt at the borders of said container is performed by deflection pulleys. Even though a rectangular container requiring four deflection pulleys is preferred, other geometries are possible within the scope of the present invention, namely, e.g., a triangular container requiring only three deflection pulleys.

In yet another preferred embodiment according to the present invention, the compartments of said container are arranged in a box that is capable of being introduced in said container.

Separated compartments within the container can be provided mainly in two different ways. The container itself can be seen as a compartment, and this compartment can be divided, e.g., by a number of partition walls. Said partition walls can be fixed to the walls of the container or can be placed within the container in a reversible way. Alternatively, a box comprising compartments can be provided that can be introduced into the undivided container.

The embodiment using a box is advantageous in several aspects. The complex container comprising the control means is reusable and after the withdrawal of a certain number of articles, a new box filled with articles can easily replace the empty or nearly empty box within the container. This enhances product supply because said boxes are cheaper, can be delivered pre-filled with articles, and can be placed in the containers quickly.

Such a box filled with articles can be introduced to the container in at least two different ways. The first alternative is a container provided with an additional opening not covered by the control means that is scaled for passing of the box. In case of, e.g., an embodiment with a rotary belt revolving around a rectangular container, two container sides are left to arrange such a second opening.

The second alternative is a control means that enables access to the entire container in a certain position. In case of, e.g., an embodiment with a rotary belt, said belt has a cut-out with a cross section extent corresponding to the cross section extent of the entire container opening.

A preferred container according to the present invention further comprises a second rotary belt arranged perpendicular to the first rotary belt.

In a more preferred container according to the present invention, said second rotary belt is directed by deflection pulleys.

In this embodiment, the container opening is covered by two rotary belts and consequently, access to the compartments of said containers can only be granted if both rotary belts are aligned to each other.

A more preferred container according to the present invention is a container wherein both rotary belts have a cut-out, said cut-outs having a cross section extent enabling access to said compartments by adjusting the position of both rotary belts.

Also for the embodiment with two rotary belts several kinds of cutouts are possible that enable granting controlled access to certain compartments within the container as explained before.

Another more preferred container according to the present invention is a container wherein said cut-outs have a cross section extent corresponding to the cross section extent of at least one compartment.

Yet another more preferred container according to the present invention is a container wherein said cut-outs have a strip-like cross section extent corresponding to the cross section extent of several compartments.

These kinds of cut-outs define an opening only at the overlapping position of both strip-like cut-outs, and this position can be adjusted by movement of one or both of said rotary belts relative to each other. Therefore, in case of snip-like cut-outs in each rotary belt, access to the container compartments is granted at the crossing point of said strip-like cut-outs and by moving the two rotary belts, said crossing point can be moved across the entire container opening.

A more preferred container according to the present invention comprises compartments with different cross section extent and rotary belts with cut-outs of different cross section extent, wherein each of said rotary belts comprise at least one cut-out with an adjusted cross section extent enabling the access of each of said different compartments.

In a more preferred container according to the present invention, said rotary belts have each one cut-out that enable the access of all compartments simultaneously when both rotary belts are arranged in a certain position.

These cut-outs in both rotary belts provide access to all compartments and can be used to load the container compartments with articles. Moreover, as explained before, it is possible to use boxes pre-filled with articles to load the container if said container has no partition into compartments of its own. Therefore, these cut-outs in both rotary belts provide the possibility to apply said boxes also for embodiments with two rotary belts.

Another preferred container according to the present invention further comprises a blocking means capable of locating the one or two closures in position.

This blocking means is preferred because it is advantageous to fix the closures after the control means has adjusted the closures in a certain position granting access to the requested article. If the control means itself may avoid disarrangement of the adjusted belts, such a blocking means is not necessary.

In a more preferred embodiment of the container of the present invention, said blocking means is a spring-loaded brake.

Yet another preferred container according to the present invention further comprises a magnet fixed to each closure and a magnetic sensor in order to detect the position of said closure.

It is necessary for the present invention that the closure cut-outs and the compartments of the container are aligned with each other because otherwise the requested articles can not be withdrawn. Since a mechanical solution to adjust the closures of the container may shift slightly with time due to inaccuracies in each movement, it is preferred to provide an automatic system to detect and correct a false position of the closures.

An also preferred container according to the present invention further comprises an electric motor capable of actuating said control means.

In another preferred container according to the present invention, said container is a freezer container.

Such a freezer container may be used for different temperatures, whereas the possible temperature for a certain embodiment may be restricted due to the mechanical equipment used to actuate the control means. Due to the easy and robust mechanics of the present invention, the container can run at temperature ranges as low as −20° C. Articles that may be stored in such a freezer container are, e.g., research chemicals and diagnostic kits.

Another aspect of the present invention is an access-controlled storage system comprising at least two containers according to the present invention, a housing, and an actuating means capable of actuating the control means of said container, wherein said actuating means grants access only to a defined compartment within said container.

Said housing of the access-controlled storage system of the present invention may comprise additional equipment depending on the intended use of the system, e.g., temperature or humidity control equipment.

A preferred access-controlled storage system according to the present invention is a storage system comprising at least 3, preferably at least 5, containers.

It is possible to provide such an access-controlled storage system with different containers, whereas differences between said containers may exist in terms of container sizes the number and/or size of the compartments of said containers, as well as the established temperature and/or humidity within the containers.

In a preferred access-controlled storage system according to the present invention, said actuating means is capable of actuating all control means of said plurality of containers.

In this preferred embodiment, a single actuating means is provided that operates the control means of each container. Alternatively, it is of course possible to provide an actuating means for each control means.

In another preferred access-controlled storage system according to the present invention, said actuating means comprises an electric motor.

In a more preferred access-controlled storage system according to the present invention, said electric motor is arranged outside of said housing.

Again, it is preferred that a single electric motor is provided that operates the control means of each container, although other embodiments with a plurality of motors may be meaningful for certain applications. Especially in cases where the interior of the housing is controlled in terms of humidity or temperature, it is preferred to arrange the electric motor outside of said housing in order to minimize harmful impact on said motor. In case of a freezer system, the freezing of mechanical components of the electric motor may even avoid its entire functioning.

Another preferred access-controlled storage system according to the present invention is a storage system comprising a single input means capable of recording and executing said user request with respect to all of said plurality of containers.

Similar to the electric motor, it is preferred to provide only one input means for user requests with respect to all of the containers of the system, even though it is of course also possible to provide an input means for each container of said plurality of containers.

Yet another preferred access-controlled storage system according to the present invention is a storage system comprising a lock capable of avoiding access of an entire container.

Even though access to articles within the containers can be avoided by the control means of the containers an additional access control can be provided to avoid access to an entire container. Such a lock may be, e.g., a lock that reversibly fixes a container within the housing of the access-controlled storage system.

In a more preferred access-controlled storage system according to the present invention, said lock is a magnetic lock or a mechanical lock.

In yet another preferred access-controlled storage system according to the present invention, said actuating means comprises a freewheel clutch, said freewheel clutch enabling the positioning of the control means of said container in one direction of motion and the release or locking of the container in the other direction of motion.

Such a freewheel clutch can be used as a lock, if, e.g., the control means of a container is provided with an additional key element such as a simple hook. If the freewheel clutch is triggered to move in one direction of motion, the control means is positioned to coordinate access to the compartments, and the key element does not move, remaining in the open or closed position. If the freewheel clutch is triggered to move in the other direction of motion, the control means does not move, and the key element can be switched from the open to the closed position and vice versa.

Another more preferred access-controlled storage system according to the present invention is a storage system wherein each container has a freewheel clutch.

A further preferred access-controlled storage system according to the present invention is a storage system comprising a magnet fixed to each closure and at least one magnetic sensor fixed to the housing in order to detect the position of said closure.

As mentioned before with respect to the containers according to the present invention, it is necessary for the present invention that the closure cut-outs and the compartments of the container are aligned with each other because otherwise the requested articles can not be withdrawn. For the access-controlled storage system it is preferred that the at least one magnetic sensor is fixed to the immobile housing in order to provide an automatic system to detect and correct a false position of the closures.

Yet another preferred embodiment of the present invention is an access-controlled storage system, wherein said access-controlled storage system is an access-controlled freezer system.

Another aspect of the present invention is a method for controlling the access to a storage system comprising a) formulating a request for an article within a container of an access-controlled storage system according to the present invention,
b) adjusting the control means accordingly in order to grant the accessibility only to the compartment containing the requested article,
c) releasing the container,
d) extracting the requested article, and
e) locking the container.

In a preferred embodiment of the method according to the present invention, said request is formulated using the input means of said storage system.

The phrase “input means” summarizes all kinds of means that are able to formulate a request in a machine readable way and therefore step a) can be performed using a keyboard, a touch screen, voice control, chip identification, biometric identification, or via a network.

A preferred method according to the present invention is a method wherein formulating a request in step a) is performed by entering an article identification number using a key board.

An article identification number is a series of numbers unique to a certain product and therefore, such an article identification number can be used to identify the requested product. Alternatively, the request can be formulated using a printed barcode and a barcode reader as input means.

Another preferred method according to the present invention is a method wherein releasing the container in step c) is performed by opening a magnetic or mechanical lock.

Throughout the present invention the phrase “releasing the container” is used to emphasize that it is preferred to also control the access to the entire container using a lock in addition to the control means that only grants access to a certain requested article.

A more preferred method according to the present invention is a method wherein said mechanical lock is a freewheel clutch.

Yet another preferred method according to the present invention is a method wherein for an access-controlled storage system according to the present invention, steps b)-e) are performed only for the respective container containing the requested article in one of its compartments.

In this embodiment of the method for controlling the access to a storage system, the access control is performed in two steps. At the beginning, all containers are locked. After a request is formulated, the control means of only one of the containers comprising the requested article is adjusted respectively, but the control means of the other containers are not activated. Afterwards, said adjusted container is unlocked to finally grant access to the requested product while the other containers remain locked.

In another preferred method according to the present invention, said adjusting step b) is performed by detecting the position of a magnet fixed to each control means relative to at least one magnetic sensor fixed to the housing.

Another preferred embodiment of the method according to the present invention further comprises an alignment step prior to the adjusting step b), said alignment step aligns the control means and the compartments to each other.

As mentioned before, the alignment of the mechanical components of the present invention may be necessary if every movement of the control means comprises a certain uncertainty and therefore, with time said uncertainties sum up to a severe displacement. Depending on the quality of the mechanical components, it is possible to base every adjustment of the control means on a detection of the magnet position or to perform a separate alignment step only from time to time. Alternatively, said alignment step may also be performed manually by the user of the access-controlled storage system.

In another more preferred method according to the present invention, said alignment step is performed by detecting the position of a magnet fixed to each control means relative to at least one magnetic sensor fixed to the housing.

In still another preferred method according to the present invention, said method is a method for controlling access to a freezer system.

What is claimed is:

1. An access-controlled storage system comprising
at least two containers, each container comprising
a plurality of compartments, each compartment having a cross section extent and designed to contain an article, and
a control means to control accessibility to said compartments, wherein said control means is capable of granting access to the article of one or more compartments at a time without moving said article and wherein said control means comprises a first rotary belt with a cut-out having a cross section extent and a second rotary belt arranged perpendicular to the first rotary belt, wherein said first and second rotary belts are directed by deflection pulleys,
a housing, and
an actuating means capable of actuating the control means of said containers wherein said actuating means grants access to one or more defined compartments within said containers.

2. The access-controlled storage system according to claim 1 wherein said actuating means comprises a freewheel clutch and wherein said freewheel clutch enables the positioning of the control means of said containers in one direction of motion and the release or locking of the containers in the other direction of motion.

3. The access-controlled storage system according to claim 1 wherein said access-controlled storage system is an access-controlled freezer system.

4. A method for controlling access to a storage system comprising formulating a request for an article within a container comprising an access-controlled storage system according to claim 1,
adjusting the control means accordingly in order to grant the accessibility to the one or more compartments containing a requested article,
releasing the container,
extracting the requested article, and
locking the container.

5. The method according to claim 4, wherein said method is a method for controlling the access to a freezer system.

* * * * *